United States Patent [19]

Brubaker et al.

[11] Patent Number: 4,840,076

[45] Date of Patent: Jun. 20, 1989

[54] LEVER DRIVE APPARATUS

[75] Inventors: Clifford E. Brubaker; Colin A. McLaurin, both of Charlottesville, Va.

[73] Assignee: The University of Virginia Alumni Patents Foundation, Charlottesville, Va.

[21] Appl. No.: 161,384

[22] Filed: Feb. 22, 1988

Related U.S. Application Data

[63] Continuation of Ser. No. 877,502, Jun. 23, 1986, abandoned.

[51] Int. Cl.[4] .............................................. F16H 37/02

[52] U.S. Cl. ........................................ 74/143; 192/80; 280/246; 280/250.1

[58] Field of Search ......... 297/DIG. 4; 280/242 WC, 280/244, 246; 192/80; 74/142, 143

[56] References Cited

U.S. PATENT DOCUMENTS

| | | | |
|---|---|---|---|
| 1,514,550 | 11/1924 | Londberg | 74/143 |
| 2,397,790 | 4/1946 | Kapusta | 74/143 |
| 3,309,110 | 3/1967 | Bulmer | 74/143 X |
| 3,666,292 | 5/1972 | Bartos . | |
| 3,897,857 | 8/1975 | Rodaway . | |
| 3,953,054 | 4/1976 | Udden et al. . | |
| 4,324,414 | 4/1982 | Wilkes . | |
| 4,354,691 | 10/1982 | Saunders et al. . | |
| 4,358,126 | 11/1982 | Mitchell et al. | 280/242 WC |
| 4,453,729 | 6/1984 | Lucken . | |
| 4,455,029 | 6/1984 | Taylor . | |
| 4,460,190 | 7/1984 | Spiess | 280/247 |
| 4,471,972 | 9/1984 | Young . | |
| 4,506,900 | 3/1985 | Korosue | 280/242 WC |
| 4,506,901 | 3/1985 | Tosti . | |
| 4,652,026 | 3/1987 | Byrge | 280/242 WC |
| 4,682,784 | 7/1987 | Anderson | 280/242 WC |
| 4,735,431 | 4/1988 | Tait | 280/242 WC |

FOREIGN PATENT DOCUMENTS

| | | | |
|---|---|---|---|
| 2235205 | 2/1973 | Fed. Rep. of Germany | 280/246 |
| 2369960 | 7/1978 | France | 280/242 WC |

*Primary Examiner*—Peter A. Aschenbrenner
*Assistant Examiner*—Thomas R. Rendos
*Attorney, Agent, or Firm*—James Creighton Wray

[57] ABSTRACT

An apparatus for propelling a wheeled vehicle which has a hand-manipulated lever that is connected to a clutch assembly. The clutch assembly has a drum that is rotatably connected to the vehicle and brake bands that are pivotably connected to the lower end of the lever. An actuator rod connected to the lever causes inward movement of the bands to engage the clutch. Once engaged the vehicle can be propelled in which ever direction the lever is being rotated.

14 Claims, 3 Drawing Sheets

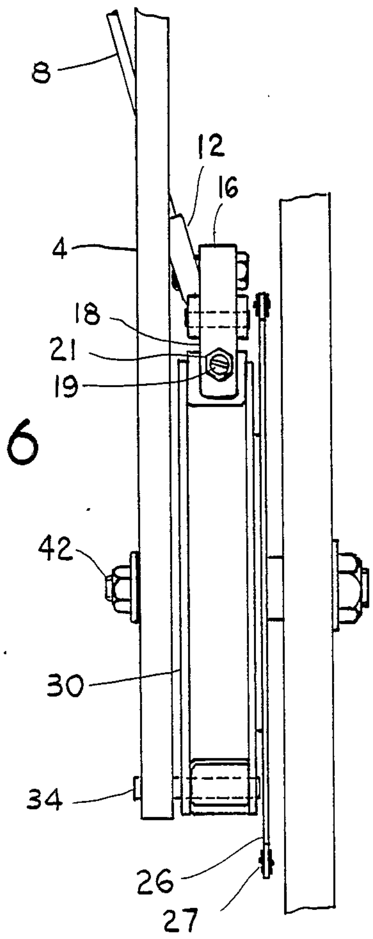
FIG. 6
FIG. 7
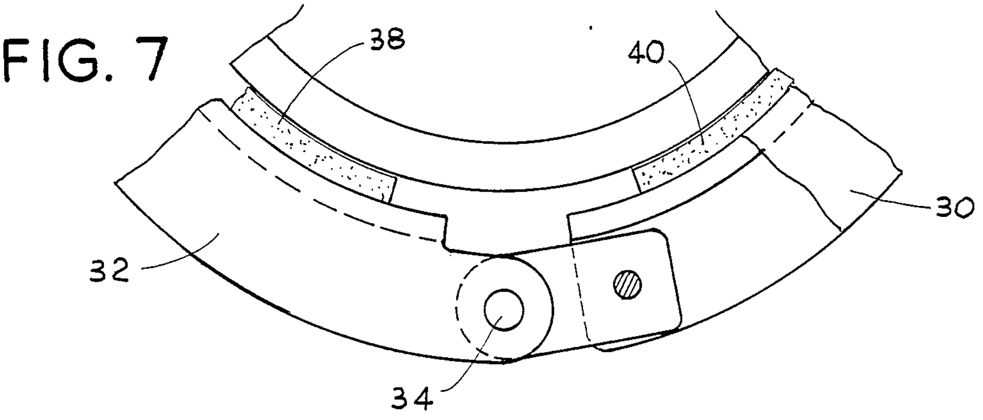

LEVER DRIVE APPARATUS

This is a continuation of copending application Ser. No. 877,502, filed on June 23, 1986, now abandoned.

BACKGROUND OF THE INVENTION

This invention applies a novel lever coupling to a spring loaded brake. The clutch is engaged by pulling levers inward and disengaged by the release of the inward pressure on the levers. Forward or reverse progression of the wheelchair is affected by the corresponding forward or reverse displacement of levers.

The invention can incorporate the use of various types of clutches such as drum-type clutch with external shoes, a drum-type clutch with internal expanding shoes, single and multi-disk clutches and hydraulic actuators.

In a preferred embodiment, a friction clutch is used for all three functions, forward, reverse and braking. The object of this invention is to provide a lever propelled with a chair comparable maneuverability to wheelchairs driven by hand rims.

U.S. Pat. No. 4,506,900 shows a lever operating wheelchair with a differential link mechanism connected to a single operational lever. This invention also includes forward and backward clutch mechanism. This patent does not appear capable of the maneuverability disclosed in the Brubaker/McLaurin invention.

U.S. Pat. No. 3,666,292 discloses a lever propelled wheelchair with a swingable chassis.

U.S. Pat. No. 3,897,857 discloses a spring activated brakedrum for a wheelchair hub.

The following references are less pertinent than those listed above: U.S. Pat. Nos.

4,455,029
4,506,901
4,471,972
4,354,691
3,953,054
4,471,972
4,455,029
4,506,901
4,324,414

SUMMARY OF THE INVENTION

The present lever propulsion system is an improvement on prior propulsion devices including handrims and lever mechanism in the following areas:

1. As an improvement over handrims, it offers
   a. Greater efficiency, and
   b. Variable Mechanical Advantage, The present invention eliminates dependence on wheel size and wheel position, thus enabling greater design latitude with respect to other functions (e.g., more compact wheelchair; ease of transfers).

The present system can be operated effectively by users with limited hand and upper extremity function.

The new system provides dynamic differential braking and direction control on sloping surfaces that does not depend on "grip" function.

It provides human powered mobility for individuals who are incapable of operating a wheelchair with handrims.

As an improvement over prior art involving lever or crank devices, the present invention provides greater control, manuverability, and braking, more compact, lighter weight, and requires no function control for direction reversal.

The invention is an application of a novel lever coupling to a springloaded band brake. The clutch is engaged by pulling the levers inward (normal to the stroking plane) and forward or reverse progression of the wheelchair is effected by corresponding forward or reverse displacement of the levers. The clutch is disengaged by release of the inward pressure on the levers, thus enabling a recovery motion to position the levers for a subsequent stroke.

Engaging the clutch by inward motion of the levers also is used as a brake if the levers are held from moving. This application of braking can be used to slow or stop the wheelchair or by unilateral or differential bilateral application to "steer" the wheelchair.

The clutch used in the prototype is a drum type with external shoes. The invention includes other types of clutches including drum type with internal expanding shoes, single and multi-disc clutches, hydraulic actuators, etc.

An important aspect of the invention is the inward motion of the levers to engage the clutch.

An object of the invention is to provide apparatus for propelling a wheeled vehicle, comprising a hand-manipulated lever having an upper portion pivotally connected to a lower portion, a clutch assembly comprising drum means rotatably connected to the vehicle, brake band means pivotally connected at lower ends to the lower portion of the lever and overlying a circumferential edge of the drum, the brake band means and drum comprising a clutch operable by frictional engagement between the brake band means and the drum, linkage means connected to an upper end of the brake band means, and actuator means, connected at one end to the upper portion of the lever and at other end to the linkage means, for actuating the clutch through the linkage means.

In a preferred embodiment the upper portion of the lever has a rotational axis perpendicular to a rotational axis for the lower portion of the lever.

In another embodiment of the actuator means comprises a connector rod having rod ends connected to opposite ends thereof, one rod end being connected to the upper portion of the lever and the opposite end being connected to the linkage means.

In another embodiment the rod end is pivotally connected to the upper portion of lever and wherein the rotational axis of the rod end is spaced outwardly from the rotational axis of the upper portion of the lever.

In another embodiment the drum means comprises a wheel having a curvilinear sidewall for frictional engagement with the brake band means, the wheel being rotatably mounted on the vehicle by means of a pin.

In another embodiment the brake band means comprises two opposed brake bands pivotally connected at one end to the lever, and friction pads fixedly connected to an inner arcuate surface of the brake bands.

In another embodiment the linkage means comprises a brace having a vertical portion connected to an end of one of the brake bands and a horizontal portion extending over an adjacent end of the opposite brake band and a bell crank being a horizontal portion pivotally connected at one end to the connector rod and pivotally connected at the other end to an outer end of the horizontal portion of the brace, and a vertical end extending downwardly toward the brake band opposite the one having the brace connected thereto, the vertical portion supporting band adjustment means.

In another embodiment the band adjustment means comprises a threaded stud threadedly received in the vertical portion and a lock nut threadedly engaging the stud and abutting the vertical portion, the stud being provided with an end slot for receiving an adjusting tool.

Preferably, stud abuts an end plate of one of the brake bands.

In another embodiment, the invention includes a sprocket, connected to the clutch assembly, for driving a chain connected to a drivable vehicle wheel.

Another object of the invention is to provide a wheelchair apparatus having lever drive means, the lever drive means comprising left and right hand side hand manipulated levers, each having an upper portion pivotally connected to a lower portion, each lower portion of each lever being connected to clutch means for selectively driving drive means connected to the clutch means, the apparatus further comprising a connector rod extending between the upper portion of each lever and the clutch means, whereby pivotal inward movement of the upper portion of the levers causes vertically inward movement of the connector rod which in turn causes radially inwardly movement of brake bands associated with the clutch means, thereby engaging the clutch means, and whereby once engaged, the levers can be moved simultaneously for and aft to effect forward and reverse motion of the wheelchair.

In a preferred embodiment the invention further comprises lever stops slideably supported on the chair frame, providing adjustable stop means to prevent further forward movement of the levers.

Preferably each clutch means comprises a drum, brake bands surrounding the drum, the brake bands having friction surfaces interposed between the bands and the drum, wherein the brake bands are connected at one end by a hinge to a lower end of the lever.

Also, each clutch means has an associated linkage connected at one end to the connector rod and at the other end to a bracket which is connected to one of the brake bands at an end opposite the hinge.

Another object of the invention is to provide a method of operating a wheelchair comprising pivoting inwardly upper portions of left and right hand side levers to engage clutch means, simultaneously rotating both levers forward to effect forward motion of the wheelchair, pivoting outwardly to an original substantially vertical position the upper portions of the levers, thereby disengaging the clutch, simultaneously rotating the levers in a rearward direction, repeating the cycle of pivoting inwardly moving forwardly pivoting outwardly and moving rearwardly to effect sustained forward motion.

Preferably, the method further comprises reversing the sequence to include, pivoting outwardly the upper portions of the levers to disengage the clutch, simultaneously moving both levers forwardly to an extended position, pivoting inwardly the upper portions of the levers to engage the clutch means, and simultaneously moving the levers rearwardly to effect rearward motion.

The method includes breaking the wheelchair by moving the levers as far forward as possible until each lever abuts a stop provided on a frame member of the chair.

BRIEF DESCRIPTION OF THE DRAWINGS

FIG. 6 is a side elevation view of the lever drive.

FIG. 7 is a detailed view of the hinged connection between brake shoes.

DETAILED DESCRIPTION OF THE DRAWING

Figure 1:
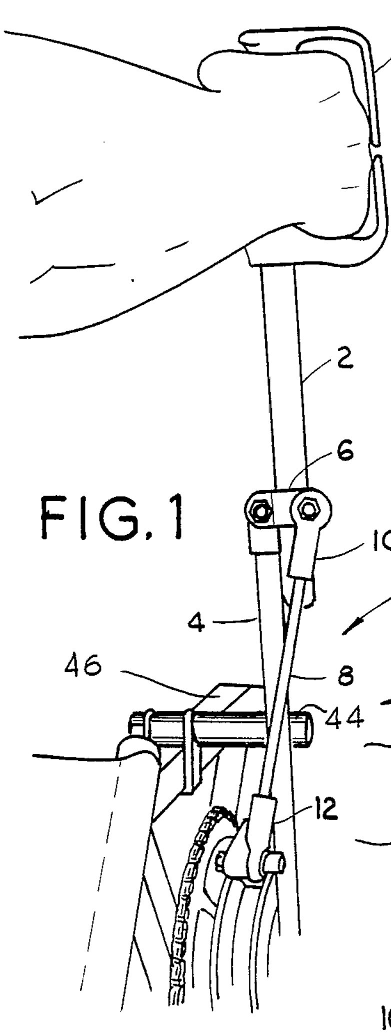
FIG. 1 is a perspective view of the lever drive in a clutch-disengage position.
Figure 2:
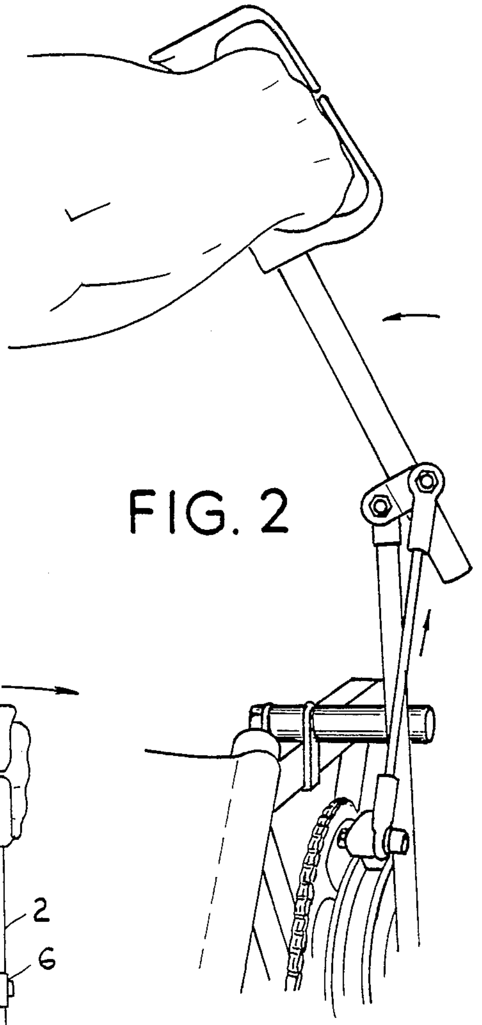
FIG. 2 is a perspective view of the lever drive in a clutch-engage position.

An apparatus for propelling a wheeled vehicle has a hand-manipulated lever 1 that is connected to a clutch assembly. The clutch assembly has a drum 36 that is rotatably connected to the vehicle and brake bands 30, 32 that are pivotably connected 34 to the lower end 4 of the lever 1. An actuator rod 8 connected to the lever 1 causes inward movement of the bands 30, 32 to engage the clutch. Once engaged the vehicle can be propelled in which ever direction the lever 1 is being rotated.

The invention is an application of a novel lever coupling to a springloaded band brake. The clutch is engaged by pulling the levers 1 inward (normal to the stroking plane) and forward or reverse progression of the wheelchair is effected by corresponding forward or reverse displacement of the levers 1. The clutch is disengaged by release of the inward pressure on the levers 1, thus enabling a recovery motion to position the levers 1 for a subsequent stroke.

Engaging the clutch by inward motion of the levers also is used as a brake if the levers are held from moving. This application of braking can be used to slow or stop the wheelchair or by unilateral or differential bilateral application to "steer" the wheelchair.

The clutch used in the prototype is a drum type with external shoes 30, 32. The invention includes other types of clutches including drum type with internal expanding shoes, single and multi-disc clutches, hydraulic actuators, etc.

An important aspect of the invention is the inward motion of the levers 1 to engage the clutch.

An object of the invention is to provide apparatus for propelling a wheeled vehicle, comprising a hand-manipulated lever 1 having an upper portion 2 pivotally connected 6 to a lower portion 4, a clutch assembly comprising drum means 36 rotatably connected to the vehicle, brake band means 30, 32 pivotally connected 34 at lower ends to the lower portion 4 of the lever 1 and overlying a circumferential edge of the drum 36, the brake band means 30, 32 and drum 36 comprising a clutch operable by frictional engagement between the brake band means 30, 32 and the drum 36, linkage means 17 connected to an upper end of the brake band means 32, and actuator means 8, connected at one end to the upper portion 2 of the lever 1 and at other end to the linkage means 14, for actuating the clutch through the linkage means 14, 17.

The upper portion 2 of the lever 1 has a rotational axis perpendicular to a rotational axis 42 for the lower portion 4 of the lever 1.

The actuator means comprises a connector rod 8 having rod ends 10, 12 connected to opposite ends thereof, one rod end 10 being connected to the upper portion 2 of the lever 1 and the opposite end 12 being connected to the linkage means 14.

Rod end 10 is pivotally connected to the upper portion 2 of lever 1 and wherein the rotational axis of the rod end 10 is spaced outwardly from the rotational axis of the upper portion 2 of the lever 1.

Figure 5:
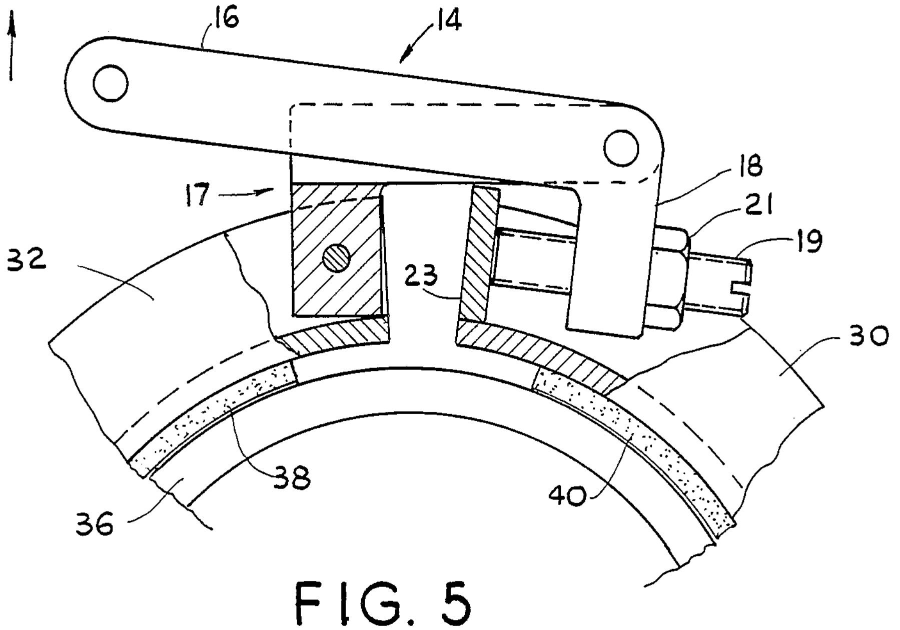
FIG. 5 is a detailed view of the bell crank of the lever drive.

As shown in FIG. 5 the linkage means comprises a brace 17 having a vertical portion connected to an end of one of the brake bands 32 and a horizontal portion extending over an adjacent end of the opposite brake band 30 and a bell crank 14 having a horizontal portion 36 pivotally connected at one end 12 to the connector rod 8 and pivotally connected at the other end to an outer end of the horizontal portion of the brace 17, and a vertical end 18 extending downwardly toward the brake band 30 opposite the one having the brace 17 connected thereto, the vertical portion 18 supporting band adjustment means.

As shown in FIG. 5, the band adjustment means comprises a threaded stud 19 threadedly received in the vertical portion and a lock nut 21 threadedly engaging the stud 19 and abutting the vertical portion 23, the stud 19 being provided with an end slot for receiving an adjusting tool.

Preferably, stud 19 abuts an end plate 23 of one of the brake bands.

Figure 3:
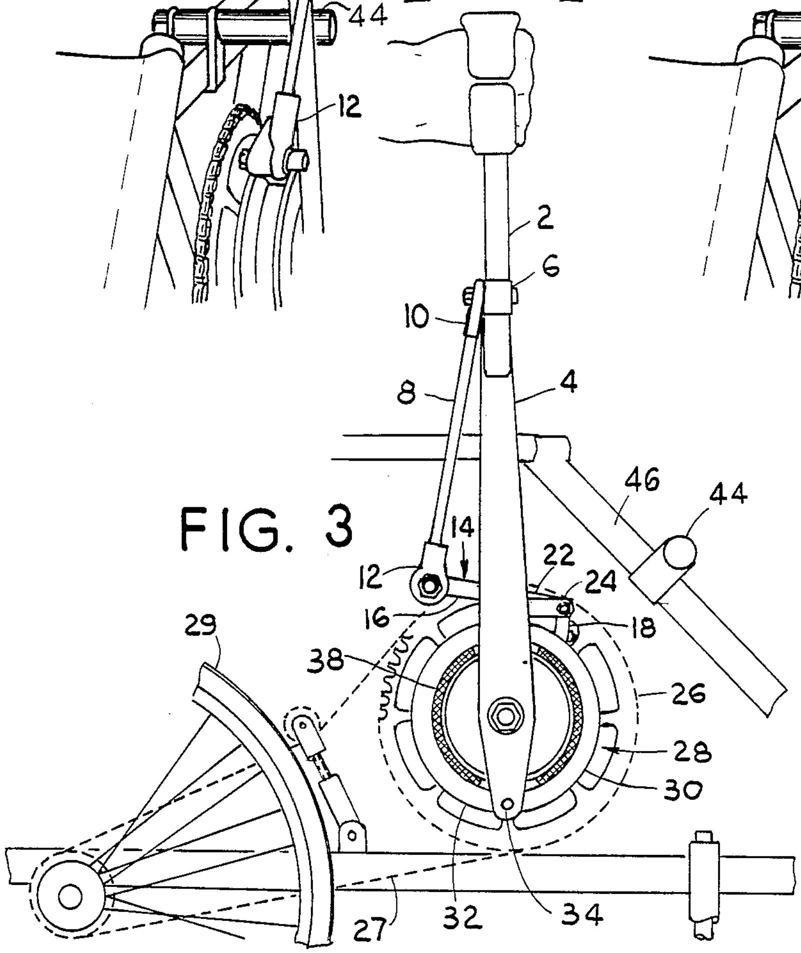
FIG. 3 is a front elevation view of the lever drive.
Figure 4:
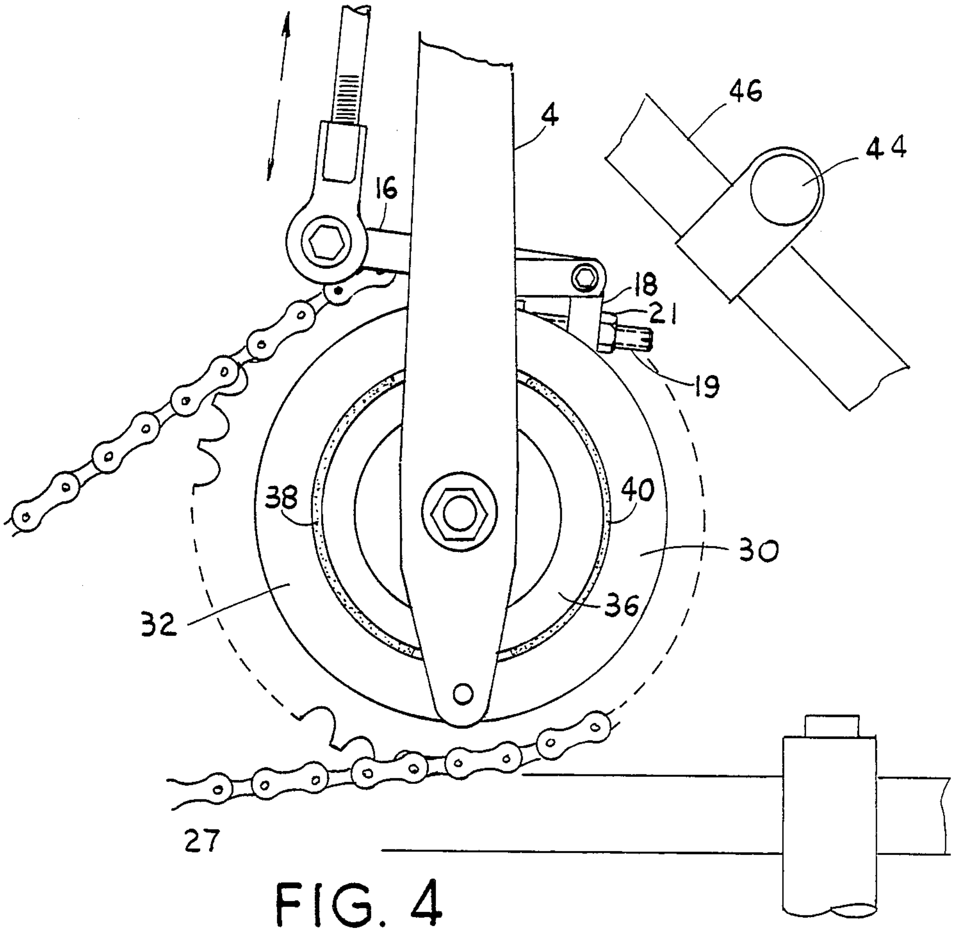
FIG. 4 is a detailed view of the lever drive shown in FIG. 3.

As shown in FIG. 3, the invention includes a sprocket 26, connected to the clutch assembly, for driving a chain 27 connected to a drivable vehicle wheel 29.

Another object of the invention is to provide a wheelchair apparatus having lever drive means, the lever drive means comprising left and right hand side hand manipulated levers 1, each having an upper portion 2 pivotally connected 6 to a lower portion 4, each lower portion 4 of each lever 1 being connected to clutch means for selectively driving drive means connected to the clutch means, the apparatus further comprising a connector rod 8 extending between the upper portion 2 of each lever 1 and the clutch means, whereby pivotal inward movement of the upper portion 2 of the levers 1 causes vertically upward movement of the connector rod 8 which in turn causes radially inwardly movement of brake bands 30, 32 associated with the clutch means, thereby engaging the clutch means, and whereby once engaged, the levers 1 can be moved simultaneously for and aft to effect forward and reverse motion of the wheelchair.

The invention further comprises lever stops 44 slideably supported on the chair frame 46, providing adjustable stop means to prevent further forward movement of the levers.

Preferably each clutch means comprises a drum 36, brake bands 30, 32 surrounding the drum 36, the brake bands 30, 32 having friction surfaces 38, 40 interposed between the bands and the drum, wherein the brake bands 30, 32 are connected at one end by a hinge 34 to a lower end 4 of the lever 1.

Also, each clutch means has an associated linkage 14, 17 connected at one end 12 to the connector rod 8 and at the other end to a bracket which is connected to one of the brake bands 32 at an end opposite the hinge.

Another object of the invention is to provide a method of operating a wheelchair comprising pivoting inwardly upper portions 2 of left and right hand side levers 1 to engage clutch means, simultaneously rotating both levers 1 forward to effect forward motion of the wheelchair, pivoting outwardly to an original substantially vertical position the upper portions 2 of the levers 1, thereby disengaging the clutch, simultaneously rotating the levers 1 in a rearward direction, repeating the cycle of pivoting inwardly moving forwardly pivoting outwardly and moving rearwardly to effect sustained forward motion.

The method further comprises reversing the sequence to include, pivoting outwardly the upper portions 2 of the levers 1 to disengage the clutch, simultaneously moving both levers 1 forwardly to an extended position, pivoting inwardly the upper portions 2 of the levers 1 to engage the clutch means, and simultaneously moving the levers 1 rearwardly to effect rearward motion.

The method includes braking the wheelchair by moving the levers as far forward as possible until each lever abuts a stop 44 provided on a frame member of the chair 46.

We claim:

1. Apparatus for propelling a wheeled vehicle, comprising:
   a hand-manipulated lever having an upper portion pivotally connected to a lower portion,
   a clutch assembly comprising drum means rotatably connected to the vehicle, brake band means pivotally connected at a lower end to the lower portion of the lever and overlying a circumferential edge of the drum, the brake band means and drum comprising a clutch operable by frictional engagement between the brake band means and the drum,
   linkage means connected to an upper end of the brake band means, and
   actuator means, connected at one end to the upper portion of the lever and at other end to the linkage means, for actuating the clutch through the linkage means.

2. The apparatus of claim 1 wherein the upper portion of the lever has a rotational axis perpendicular to a rotational axis for the lower portion of the lever.

3. The apparatus of claim 2 wherein the actuator means comprises a connector rod having rod ends connected to opposite ends thereof, one rod end being connected to the upper portion of the lever and the opposite end being connected to the linkage means.

4. The apparatus of claim 3 wherein the rod end is pivotally connected to the upper portion of the lever and wherein the rotational axis of the rod end is spaced outwardly from the rotational axis of the upper portion of the lever.

5. The apparatus of claim 4 wherein the drum means comprises a wheel having a curvilinear sidewall for frictional engagement with the brake band means, the wheel being rotatably mounted on the vehicle by means of a pin.

6. The apparatus of claim 5 wherein the brake band means comprises two opposed brake bands pivotally connected at one end to the lever, and friction pads fixedly connected to an inner arcuate surface of the brake bands.

7. The apparatus of claim 6 wherein the linkage means comprises a brace having a vertical portion connected to an end of one of the brake bands and a horizontal portion extending over an adjacent end of the opposite brake band and a bell crank having a horizontal portion pivotally connected at one end to the connector rod and pivotally connected at the other end to an upper end of the horizontal portion of the brace, and a vertical and extending downwardly toward the brake band opposite the one having the brace connected thereto, the vertical portion supporting band adjustment means.

8. The apparatus of claim 7 wherein the band adjustment means comprises a threaded stud threadedly received in the vertical portion and a lock nut threadedly engaging the stud and abutting the vertical portion, the stud being provided with an end slot for receiving an adjusting tool.

9. The apparatus of claim 8 wherein an end of the stud abuts an end plate of one of the brake bands.

10. The apparatus of claim 1 further comprising a sprocket, connected to the clutch assembly, for driving a chain connected to a drivable vehicle wheel.

11. A wheelchair apparatus having lever drive means, the lever drive means comprising left and right hand side hand manipulated levers, each having an upper portion pivotally connected to a lower portion, each lower portion of each lever being connected to clutch means for selectively driving drive means connected to the clutch means, the apparatus further comprising a connector rod extending between the upper portion of each lever and the clutch means, whereby pivotal inward movement of the upper portion of the levers causes vertically upward movement of the connector rod which in turn causes radially inwardly movement of brake bands associated with the clutch means, thereby engaging the clutch means, and whereby once engaged, the levers can be moved simultaneously for and aft to effect forward and reverse motion of the wheelchair.

12. The apparatus of claim 11 further comprising lever stops slideably supported on the chair frame, providing adjustable stop means to prevent further forward movement of the levers.

13. The apparatus of claim 12 wherein each clutch means comprises a drum, brake bands surrounding the drum, the brake bands having friction surfaces interposed between the bands and the drum, wherein the brake bands are connected at one end by a hinge to a lower end of the lever.

14. The apparatus of claim 13 wherein each clutch means has an associated linkage connected at one end to the connector rod and at the other end to a bracket which is connected to one of the brake bands at an end opposite the hinge.

* * * * *